(12) United States Patent
Bausen et al.

(10) Patent No.: US 9,061,773 B2
(45) Date of Patent: Jun. 23, 2015

(54) METHOD AND APPARATUS FOR THE FINAL ASSEMBLY OF AIRCRAFT

(75) Inventors: Dirk Bausen, Harsefeld (DE); Peter Freimark, Hamburg (DE); Axel Sauermann, Hemlste-Deinste (DE); Thomas Opschondek, Ingolstadt (DE)

(73) Assignee: Airbus Operations GmbH (DE)

( * ) Notice: Subject to any disclaimer, the term of this patent is extended or adjusted under 35 U.S.C. 154(b) by 458 days.

(21) Appl. No.: 12/837,696

(22) Filed: Jul. 16, 2010

(65) Prior Publication Data

US 2011/0010912 A1    Jan. 20, 2011

Related U.S. Application Data (60) Provisional application No. 61/226,292, filed on Jul. 17, 2009.

(30) Foreign Application Priority Data

Jul. 17, 2009    (DE) .......................... 10 2009 033 664

(51) Int. Cl.
   *B23P 17/04*    (2006.01)
   *B64F 5/00*    (2006.01)

(52) U.S. Cl.
   CPC ......... *B64F 5/0009* (2013.01); *Y10T 29/49826* (2015.01); *Y10T 29/53539* (2015.01)

(58) Field of Classification Search
   CPC ...................................................... B64F 5/0009
   USPC ........ 29/897.2, 429, 430, 431, 783, 785, 787, 29/791, 792, 795, 822; 198/580, 465.2
   See application file for complete search history.

(56) References Cited

U.S. PATENT DOCUMENTS

| | | | |
|---|---|---|---|
| 5,090,508 A * | 2/1992 | Nishikawa | 187/211 |
| 5,375,283 A * | 12/1994 | Silberman | 14/69.5 |
| 6,651,867 B2 * | 11/2003 | Angel | 228/49.1 |
| 6,672,221 B2 * | 1/2004 | Hadley | 104/35 |
| 7,513,033 B2 * | 4/2009 | Pfeiffer et al. | 29/742 |
| 2004/0035314 A1 * | 2/2004 | Muchalov | 104/44 |
| 2007/0040066 A1 * | 2/2007 | McCoskey et al. | 244/137.1 |
| 2008/0250626 A1 * | 10/2008 | Frankenberger et al. | 29/430 |

FOREIGN PATENT DOCUMENTS

FR    2 540 063 A2 *    2/1983    ................ B63B 9/06

* cited by examiner

*Primary Examiner* — David Bryant
*Assistant Examiner* — Steven A Maynard
(74) *Attorney, Agent, or Firm* — Lerner, David, Littenberg, Krumholz & Mentlik, LLP (57) ABSTRACT

A method for final assembly of at least two aircraft includes assembling the at least two aircraft in a transverse direction on a carousel, the at least two aircraft disposed side-by-side, and rotating the carousel on a vertical rotation axis 360°.

12 Claims, 6 Drawing Sheets

METHOD AND APPARATUS FOR THE FINAL ASSEMBLY OF AIRCRAFT

CROSS REFERENCE TO PRIOR APPLICATIONS

Priority is claimed to German Patent Application No. 10 2009 033 664.8, filed Jul. 17, 2009 and U.S. Provisional Application No. 61/226,292, filed Jul. 17, 2009.

FIELD

The invention relates to a method for the final assembly of aircraft and to an apparatus for carrying out the method.

BACKGROUND

Conventionally, aircraft are produced in clocked lines on separate construction sites. In this principle an aircraft to be assembled is moved in longitudinal direction between a multitude of construction sites in which in each case certain assembly steps or test steps are carried out. Examples include fuselage assembly, wing assembly, as well as ground testing of aircraft systems.

It is also known to produce aircraft in assembly line setups. Modelled after the technique used in automobile construction, the aircraft is continually moved in longitudinal direction through the individual construction sites and in this process is assembled.

In these known final assembly principles it is, however, a critical point that assembly difficulties experienced with one aircraft have a negative effect on the entire assembly line. Skipping individual construction sites or assembly steps is not possible. While making the respective aircraft leave clocked production is possible in principle, this is, however, associated with considerable effort and expenditure. There is a further disadvantage in that assembly in longitudinal direction of the aircraft requires a relatively large amount of space. Furthermore, in clocked line assembly the aircraft need to be moved with considerable effort and expenditure between the construction sites.

Patent application US 2008/0250626 A1 by the applicant proposes that, at least in the installation of fittings, fuselage sections be arranged in transverse direction side by side. In each case the fuselage sections rest on a transport vehicle and are continuously moved in transverse direction along a circular path from one construction site to the next construction site.

While movement of the fuselages in transverse direction side by side requires less space than does an arrangement of the fuselages in longitudinal direction, in the method according to US 2008/0250626 A1 skipping individual construction sites is, however, not possible either. Furthermore, controlling the individual transport vehicles is associated with relatively great effort and expenditure.

SUMMARY OF THE INVENTION

It is an aspect of the present invention to create a method for the final assembly of aircraft, which method avoids the above-mentioned disadvantages, and in which method assembly difficulties experienced with individual aircraft do not have an effect on the entire assembly line, as well as to create an apparatus for carrying out the method.

In a method according to the invention for the final assembly of aircraft said aircraft are installed side by side on a carousel that is rotated on a vertical rotation axis by 360°.

This method provides an advantage in that the alignment of the aircraft in transverse direction side by side requires relatively little space. Since the aircraft are arranged on a carousel, there is no longer any requirement to provide the elaborate and expensive control of individual transport vehicles.

In an exemplary embodiment the aircraft to be assembled once enter clocked production in a construction site on the carousel, where they remain until they leave the carousel. In other words, the assembly tests and ground tests are carried out in all the construction sites. This provides an advantage in that any assembly difficulties relating to one aircraft do not have a negative effect on the assembly line or on the throughput time of the remaining aircraft. There is no need to make the respective aircraft leave clocked production; instead, the construction site is not taken into account the next time an aircraft enters clocked production, so that the construction site is quasi skipped. In contrast to the situation with the known assembly principles, there is thus no fear of the entire assembly line coming to a standstill.

The carousel preferably carries out continuous rotational movement. Consequently, the carousel can move more slowly when compared to clocked rotational movement, which has a positive effect on the working conditions.

The rotational speed of the carousel is variable. Preferably, it is, however, selected in such a manner that after 360°-rotation the final assembly of a newly-to-be-assembled aircraft commences. This provides in particular an advantage in that entering clocked production always takes place in the same region of the carousel.

The aircraft preferably leave clocked production at a uniform rotational position of the carousel. This is associated with an advantage in that aircraft leave clocked production always at the same external region of the carousel, and consequently the infrastructure necessary for aircraft to leave clocked production has to be provided only once. In an exemplary embodiment the rotational speed is selected in such a manner that an aircraft leaves clocked production after a 300°-rotation.

In an exemplary embodiment the aircraft are positioned so that their cockpits face the centre of the carousel. In another exemplary embodiment the aircraft are positioned with their aft sections facing the centre of the carousel. Such entering of clocked production with the aft section facing the centre of the carousel is associated with an advantage in that it is not necessary to provide large and extensive assembly platform structures in order to install structural components such as the vertical tail unit and the elevator unit, the tail cone, or the auxiliary power unit (APU), as such structures can be replaced by a simple centrally-arranged work stage. Furthermore, there is no longer the time-consuming and risky handling of assembly work platforms when an aircraft enters or leaves clocked production, because these platforms are almost entirely replaced by the central work stage. This saves time, and consequently final assembly of an aircraft can be carried out in a relatively short period of time so that entering clocked production with the aft section facing the centre is suitable to achieve a particularly high final assembly rate. Entering clocked production with the aft section facing the centre is advantageous in particular in the case of aircraft whose engines are arranged on the aircraft's aft section, because in contrast to an arrangement of the engines on the wings the corresponding final assembly steps are moved from the wing region to the region of the aircraft's aft section.

A preferred apparatus for carrying out the method according to the invention comprises a carousel for receiving and for the assembly of the aircraft, which carousel can be rotated by 360° on a vertical rotation axis. The aircraft are quasi arranged in a star-shaped manner on the carousel so that the apparatus can be of a very compact design. Integration of the apparatus in the surroundings is thus possible with a modest requirement for space.

In an exemplary embodiment the carousel comprises a circular external circumference and is divided into segments, with a construction site for assembly of the aircraft being associated with each segment. The carousel can thus be divided into construction sites of equal size, and the rotational speed of the carousel can be constant. Furthermore, the segments open from the centre of the carousel in the direction of the external circumference so that the supply of large parts to the respective aircraft does not impede assembly in the adjacent construction sites.

In the centre of the carousel preferably a work stage is provided for the storage of materials and for the preparation of assembly activities. Consequently, the entire external circumference of the carousel is freely accessible, and the aircraft can easily enter or leave clocked production.

Advantageously, during rotational movement of the carousel the work stage can move along as well so that regular elaborate positioning of the aircraft relative to the work stage is no longer necessary.

In an exemplary embodiment the apparatus is arranged in a hall, wherein at least some of the lateral walls of said hall extend tangentially to the external circumference of the carousel. This arrangement makes it possible for the hall to have a small floor area.

The stated angles relating to the carousel are relative values; they are not to be interpreted exclusively as providing exact separation between the individual phases. Thus it is quite possible for individual adjacent phases to overlap. In other words, a subsequent phase can commence although the preceding phase has not yet been completed.

The number of aircraft arranged on the carousel is basically flexible; as a matter of principle it is guided by the final assembly rate to be achieved.

Control of the carousel can be adapted to the respective production conditions. It is thus quite imaginable for the rotational speed to be increased or decreased, or for the carousel to be moved in a clocked manner.

Furthermore, it should be mentioned that individual aircraft components can already be assembled prior to them entering clocked production on the carousel. Thus the fuselage can already be preassembled or the wings can already form a common wing module (see the second and third exemplary embodiments) before they are fed to the carousel.

BRIEF DESCRIPTION OF THE DRAWINGS

Below, preferred exemplary embodiments of the invention are explained in more detail with reference to diagrammatic illustrations. The following are shown.

DETAILED DESCRIPTION

In the figures the same design elements have the same reference characters, wherein, in the case of a figure comprising several identical design elements, for the sake of clarity it is possible that only one of these design elements comprises a reference character.

Figure 1:
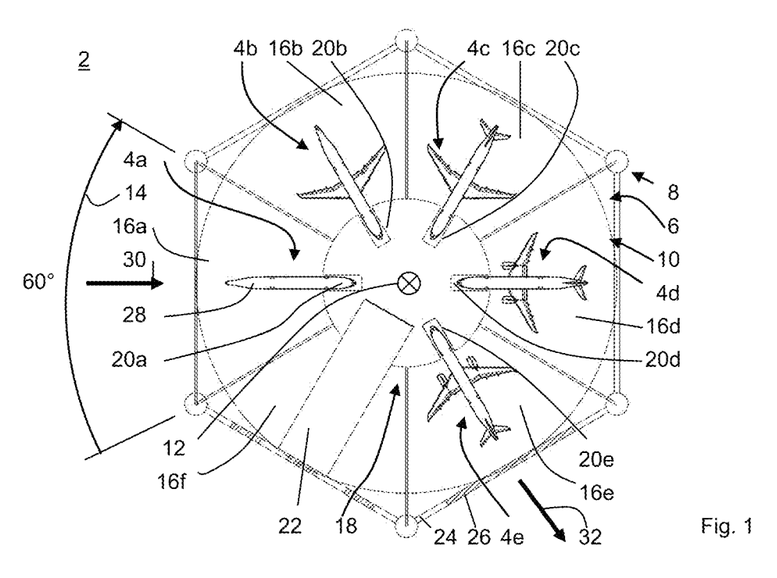
FIGS. 1 to 6 in each case a top view of a first exemplary embodiment of an apparatus according to the invention, which figures in each case show a stage in an aircraft's final assembly according to the invention, FIG. 7 a top view of a second exemplary embodiment according to the invention, FIG. 8 a detailed view from FIG. 7, FIG. 9 a top view of a third exemplary embodiment according to the invention, FIG. 10 a top view of a fourth exemplary embodiment according to the invention, and FIG. 11 a side sectional view of a work stage in an embodiment according to the invention.

According to FIG. 1 an apparatus 2, according to the invention, for final assembly of a multitude of aircraft 4a, 4b, . . . comprises a carousel 6 that is arranged in a hall 8.

The carousel 6 is used for receiving the aircraft 4a, 4b, . . . and comprises a circular external circumference 10. Said carousel 6 is arranged level with a hall floor and is held on rails (not shown) so as to be rotatable by 360° on a vertical rotation axis 12. Its rotational speed is flexibly adjustable to respective production conditions by way of a drive (not shown). Said drive allows infinitely variable smooth and uniform rotation of the carousel 6. Preferably, the carousel 6 carries out a continuous rotational movement in clockwise direction.

The carousel 6 is divided into a multitude of equally-sized segments 16a, 16b, . . . that open up from the centre of the carousel 6 in a funnel-shaped manner towards the external circumference 10. The number of segments 16a, 16b, . . . corresponds to the number of aircraft 4a, 4b, . . . that can simultaneously be arranged on the carousel 6. In the exemplary embodiment shown, in principle six aircraft 4a, 4b, . . . can simultaneously be positioned on the carousel, so that each segment 16a, 16b, . . . encompasses 60° of the external circumference 10. The radial depth of the segments 16a, 16b, . . . or the radius of the carousel 6 has been selected in such a manner that the aircraft 4a, 4b, . . . are arranged entirely, i.e. including their tail units, on the carousel 6. A construction site for the aircraft 4a, 4b, . . . has been allocated to each segment 16a, 16b, . . . , wherein on each construction site any and all final assembly steps can be carried out.

Figure 11:
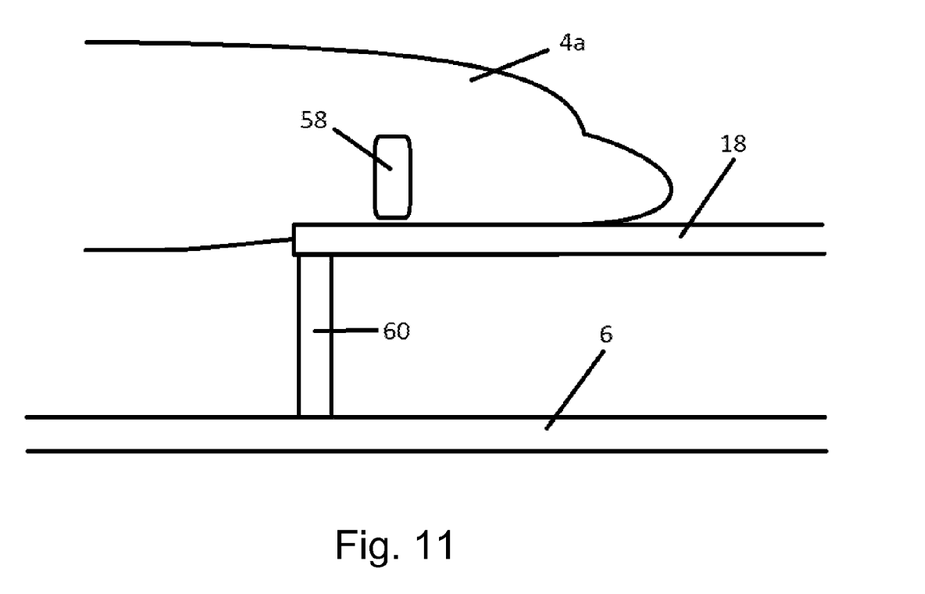

In the center of the carousel 6 a circular or annular work stage 18 is positioned which is predominantly used as a storage place for cabin components and for preparatory work for cabin installation. Said work stage 18 is arranged on scaffolding 60 on the carousel 6 so that during rotation of the carousel 6 it moves along with it. Said work stage 18 is arranged on scaffolding 60 in such a manner that it is possible to enter the aircraft 4a, 4b, . . . in an almost level manner through their doors 58 on the cockpit end (see FIG. 11). In the center of said work stage 18 a goods lift (not shown) is provided for transporting materials.

In each segment 16a, 16b, . . . the work stage 18 comprises a U-shaped receiving device 20a, 20b, . . . , which is open in radial direction, for making an aircraft 4a, 4b, . . . enter clocked production. In the state of clocked production the aircraft 4a, 4b, . . . are inserted into the receiving devices 20a, 20b, . . . at least up to their doors on the cockpit end. An aircraft 4a, 4b, . . . which at commencement of its assembly enters clocked production in the receiving device 20a, 20b, . . . remains in this receiving device 20a, 20b, . . . and thus in this segment 16a, 16b, . . . or construction site until it leaves the carousel 6. This obviates the need for elaborate and expensive movement of the aircraft 4a, 4b, . . . between construction sites. Carrying out all the assembly steps in each segment 16a, 16b, . . . provides an advantage in that there is no interdependence between constructions sites and that thus any assembly difficulties in one construction site do not have a disadvantageous effect on parallel assembly of the further aircraft 4a, 4b, . . . on the carousel 6 on the other construction sites. In particular, in such a case the respective aircraft 4a, 4b, . . . can remain on the construction site until the problem is fixed, rather than having to leave clocked production and subsequently having to enter clocked production again in an elaborate and expensive manner.

The aircraft 4a, 4b, . . . are arranged in transverse direction side by side on the carousel, and on their cockpit ends are accommodated in the receiving devices 20a, 20b, . . . of the work stage 18. They are quasi arranged in a star-shaped manner on the carousel 6, with their longitudinal axes pointing radially outwards. In this way the aircraft 4a, 4b, . . . can quickly enter or leave timed production in radial direction.

Supplying the construction sites with necessary assembly materials takes place while the assembly process is ongoing, with unchanged rotation of the carousel 6 by way of a virtual logistics region 22 that radially extends from the external circumference 10 of the carousel 6 to the work stage 18 by way of the respective segment 16a, 16b, . . . . Supplying assembly materials to the respective construction site takes place after an aircraft 4a, 4b, . . . has left final assembly, and before an aircraft 4a, 4b, . . . that is to be assembled enters clocked production. Furthermore, the logistics area 22 can be used as a buffer to even out assembly difficulties on one of the construction sites.

Supplying the construction sites with necessary media such as electrical current, water, hydraulics, fuel, air etc. takes place by way of a central system coupling (not shown) which correspondingly bridges rotation of the carousel 6.

Transporting large components such as a fuselage, wing, running gear, tail unit and engine takes place by way of crane facilities (not shown) that are guided by correspondingly designed arc-shaped or circular rails in the region of a hall ceiling.

The rotational speed of the carousel 6 is guided by the slowest assembly step and in particular by the monthly assembly rate of aircraft 4a, 4b, . . . to be assembled, and on the number of work shifts. For example, if in the exemplary embodiment shown 40 aircraft 4a, 4b, . . . are to be assembled per month, then at 20 working days each comprising 2 shifts, during each shift one aircraft 4a, 4b, . . . must leave the carousel 6. In other words, during each shift one assembled aircraft 4a, 4b, . . . leaves clocked production, while on the construction site that has become free a new aircraft 4a, 4b, . . . to be assembled enters clocked production. The rotational speed is preferably selected in such a manner that following complete rotation of 360° an aircraft 4a, 4b, . . . that is to be assembled enters clocked production. In order to prepare the respective construction site during a shift, preferably an aircraft 4a, 4b, . . . which has undergone final assembly leaves clocked production after a rotation of 300°. During an eight-hour shift, the carousel 6 thus rotates by 60°. Consequently, full rotation of 360° therefore takes place in 48 h.

The hall 8 is designed as a polygon comprising a multitude of identical sidewalls 24. According to the exemplary embodiment shown, said hall 8 is a hexagon comprising six sidewalls 24. The sidewalls 24 extend tangentially to the carousel 6, each sidewall 24 comprising a gate 26. There is thus individual radial access to each segment 16a, 16b, . . . without the adjacent construction sites being impeded. Thus the aircraft 4a, 4b, . . . can, for example, enter or leave clocked production at any time.

Below, a method according to the invention is explained with reference to FIGS. 1 to 6. In this arrangement five aircraft 4a, 4b, . . . are always assembled simultaneously. This means that in each of the receiving devices 20a to 20e one aircraft 4a, 4b, . . . undergoes clocked production. The carousel 6 continuously turns clockwise by 60° every eight hours.

According to FIG. 1, final assembly of an aircraft 4a commences in segment 16a with the process of connecting an open fuselage section on the cockpit end to a cockpit to form the fuselage 28. To this effect the necessary components such as the fuselage section and the cockpit enter production in segment 16a according to arrow 30. Before the fuselage section is closed off at the front by the cockpit, cabin components, for example a galley element, can be slid into the fuselage section. Parallel to the fuselage assembly in segment 16a, according to arrow 32 an aircraft 4e that has just undergone final assembly leaves clocked production in segment 16e. Segment 16f represents the logistics area 22 for preparing the subsequent final assembly of an aircraft.

Figure 2:
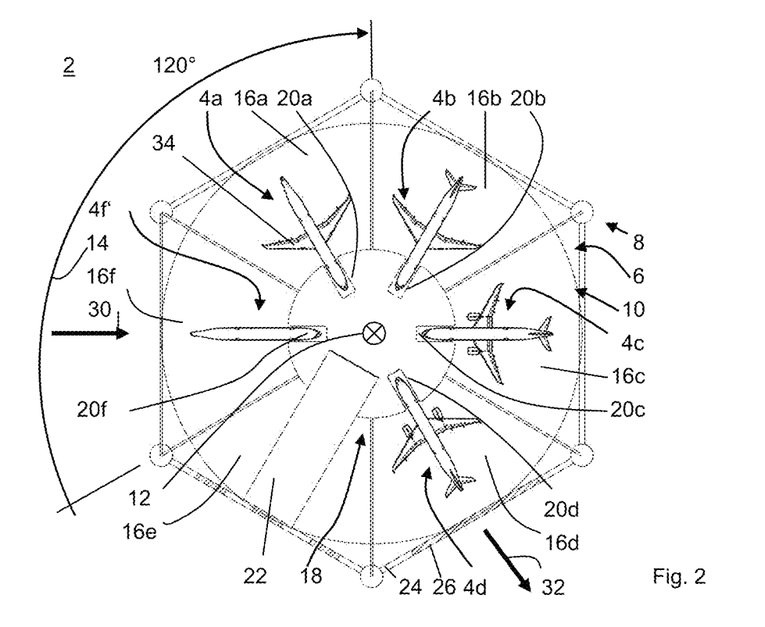

Following completion of fuselage assembly in segment 16a the carousel 6 has rotated by 60°, and, according to FIG. 2, in segment 16a among other activities the assembly of the wing and the running gear, hereinafter referred to as "wing assembly" takes place. The large components necessary for this, such as the wing 34, are positioned in segment 16a after fuselage assembly. Parallel to the wing assembly, an aircraft 4d that has just undergone final assembly leaves clocked production in segment 16d, and fuselage assembly of a new aircraft 4f' commences in segment 16f. Segment 16e represents the logistics area 22 for preparing the subsequent final assembly of an aircraft.

Figure 3:
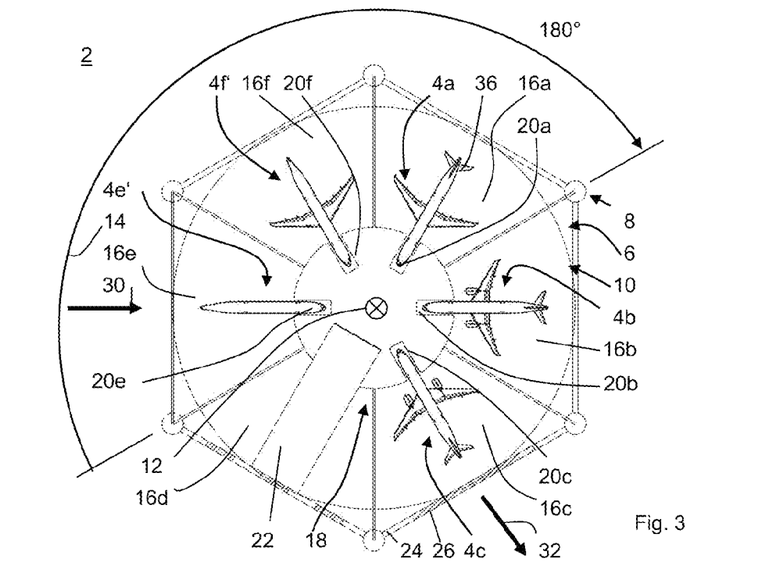

Following completion of wing assembly in segment 16a the carousel 6 has rotated by 120°, and, according to FIG. 3, in segment 16a among other activities the assembly of the cabin and the tail unit, hereinafter referred to as "cabin assembly", commences. The large components necessary for this, such as a tail unit 36, are correspondingly positioned in segment 16a after wing assembly. Likewise, some ground tests, for example a cabin pressure test, are carried out. Parallel to the cabin assembly, an aircraft 4c that has just undergone final assembly leaves segment 16c, and fuselage assembly of a new aircraft 4e' commences in segment 16e. Meanwhile, in segment 16f wing assembly and in segment 16e fuselage assembly are already being carried out. Segment 16d represents the logistics area 22 to prepare subsequent aircraft final assembly.

Figure 4:
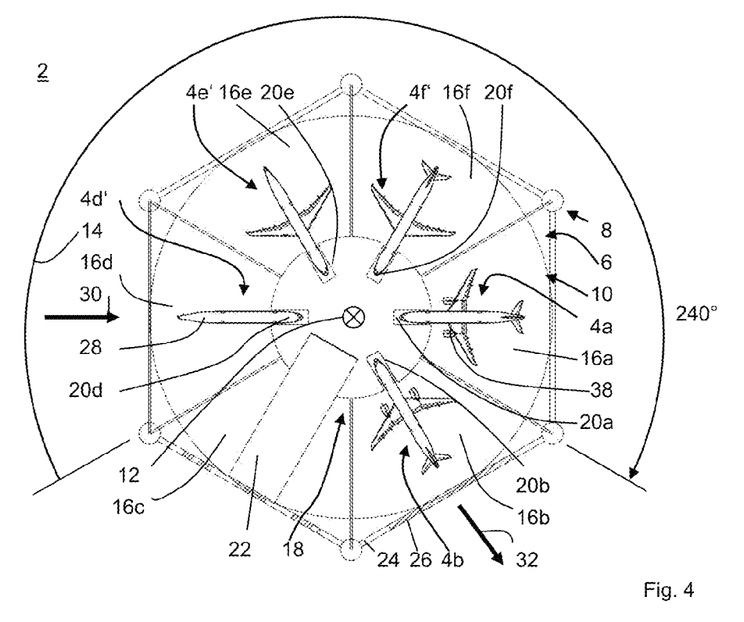

Following completion of cabin assembly in segment 16a the carousel 6 has rotated by 180°, and according to FIG. 4 engine installation 38 takes place. Likewise, ground tests, for example tank leakage tests, are carried out. Parallel to engine installation, an aircraft 4b that has just undergone final assembly leaves segment 16b, and fuselage assembly of a new aircraft 4d' commences in segment 16d. Meanwhile, in segment 16f cabin assembly and in segment 16e wing assembly are already being carried out. Segment 16c represents the logistics area 22 to prepare subsequent aircraft final assembly.

Figure 5:
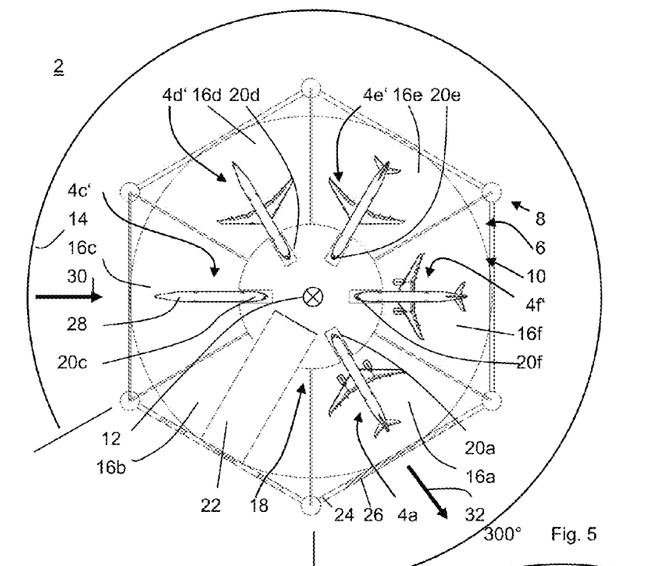

Following completion of engine assembly in segment 16a the carousel 6 has rotated by 240°, and according to FIG. 5 in segment 16a further ground tests such as systems tests or flight simulation tests, hereinafter referred to as the "end phase", commence. The end phase is completed when the aircraft 4a that has just undergone final assembly leaves clocked production in segment 16a. Meanwhile in segment 16f engine installation, in segment 16e cabin assembly, in segment 16d wing assembly and in segment 16c fuselage assembly of a new aircraft 4c' are prepared. Segment 16b represents the logistics area 22 to prepare subsequent aircraft final assembly.

After the aircraft 4a has left clocked production in segment 16a, final assembly of the aircraft 4a is complete. The carousel 6 has rotated by 300°, and according to FIG. 6, segment 16a represents the logistics area 22 for preparation of a new fuselage assembly. Meanwhile in segment 16f the end phase is prepared, in segment 16e the engine installation, in segment 16d the cabin assembly, in segment 16c the wing assembly and in segment 16b the fuselage assembly of a new aircraft 4b'.

Figure 6:
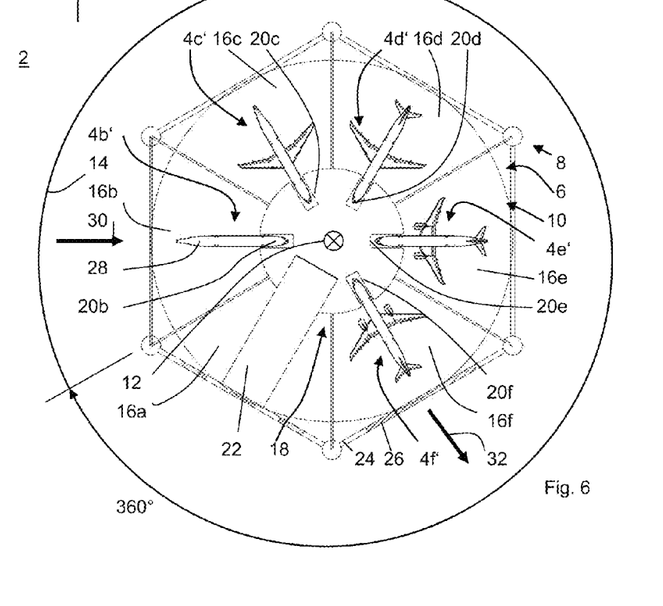

When segment 16a has been equipped with the necessary materials and components for new fuselage assembly, the carousel has rotated by 360°, and after the aircraft 4f that has just undergone final assembly leaves segment 16f, the logistics area 22 is formed in said segment. Parallel to this, in segment 16e the end phase, in segment 16d engine installation, in segment 16c cabin assembly and in segment 16b wing assembly are prepared. In other words, following complete rotation of the carousel 6 the assembly process is repeated in each segment, wherein in the case of trouble-free assembly an aircraft 4a, 4b, . . . already leaves clocked production after rotation by 300°, and can, for example, be moved on for painting or for flight testing.

If during assembly of the aircraft 4a, 4b, . . . a time delay were to occur in any of the segments 16a, 16b, . . . , the affected aircraft can remain in segment 16a, 16b, . . . until the problems have been ironed out. Either the difficulties are fixed before the carousel has completed rotation by 360°, or when clocked production of fuselage assembly of a new aircraft commences the respective segment 16a, 16b, . . . is skipped. In principle there is no need to adjust the rotational speed of the carousel 6, nor to make the affected aircraft 4a, 4b, . . . leave clocked production.

Figure 7:
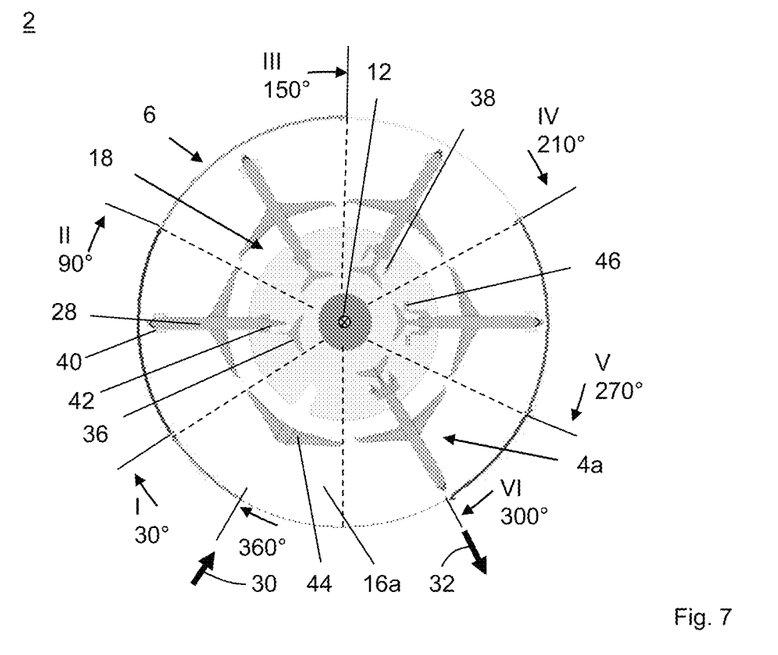

FIG. 7 shows a second exemplary embodiment according to the invention, which shows the individual steps or phases of final assembly during 360° rotation of a carousel 6 on a construction site 16a. In contrast to the above-described exemplary embodiments according to FIGS. 1 to 6 the aircraft 4a, 4b, . . . are not accommodated by their cockpits 40 in the work stage 18, but instead by their aft sections 42. The carousel 6 is divided into six construction sites or segments 16a, 16b, . . . and carries out a continuous rotational movement on its vertical rotation axis 12. In this arrangement six aircraft 4a, 4b, . . . can simultaneously undergo final assembly on the carousel 6. Correspondingly, final assembly is divided into six phases I to VI, wherein in each construction site 16a, 16b, . . . all the final assembly steps are carried out. In the centre of the carousel 6 a work stage 18 is arranged, which moves along with the carousel 6 when the latter makes a rotational movement. Below, the function of the carousel 6 is explained with reference to construction site 16a.

In a first phase I two individual wings and individual fuselage sections (not shown) enter clocked production on the carousel 6 on the construction site 16a according to arrow 30, and are joined to form a wing module 44 and a fuselage 28.

In a second phase II, which commences following 30°-rotation of the carousel 6, wing assembly takes place in which the preassembled wing module 44 is connected to the fuselage 28. Furthermore, tail unit assembly is carried out, in which a tail unit 36 that has previously been deposited on the construction site 16a is connected to the aircraft's aft section 42. Furthermore, system installation commences, in which, for example, electrical, pneumatic and hydraulic systems are installed. Furthermore, final assembly or cabin installation takes place.

In a third phase III, which commences after 90°-rotation of the carousel 6, system installation is completed and cabin assembly continues.

In a fourth phase IV, which commences following 150°-rotation of the carousel 6, engine installation commences, in which engines 38 that have previously been deposited on the construction site 16a are installed on the aircraft's aft section 42 with their engine nacelles (not shown). The engines 38 are designed as open rotor engines. Cabin assembly is completed in this phase IV.

In a fifth phase V, which commences following 210°-rotation of the carousel 6, engine installation is completed with the installation of rotors 46 that have previously been deposited on the work stage 18, and the end phase with final ground tests is initiated.

In a sixth phase VI, which commences following 270°-rotation of the carousel 6, the aircraft 4a has undergone final assembly and leaves clocked production according to arrow 32. The aircraft leaves the carousel 6 and is, for example, moved on for painting and is subsequently moved to the flight line for the purpose of flight testing.

In a clearance and preparation phase, which commences after rotation of 300° of the carousel 6, the construction site 16a is cleared and prepared for final assembly of a new aircraft 4a'. During the clearance and preparation phase the carousel rotates a further 60° so that on completion of the clearance and preparation phase it has rotated by 360°, and the first phase I of final assembly of the new aircraft 4a' on construction site 16a can commence. For the sake of completeness it should be mentioned that this new aircraft 4a' is already the seventh aircraft that is assembled on the carousel 8, because after termination of each phase I to VI on the construction site 16a a new aircraft enters clocked production in construction sites 16b, 16c, . . . .

Figure 8:
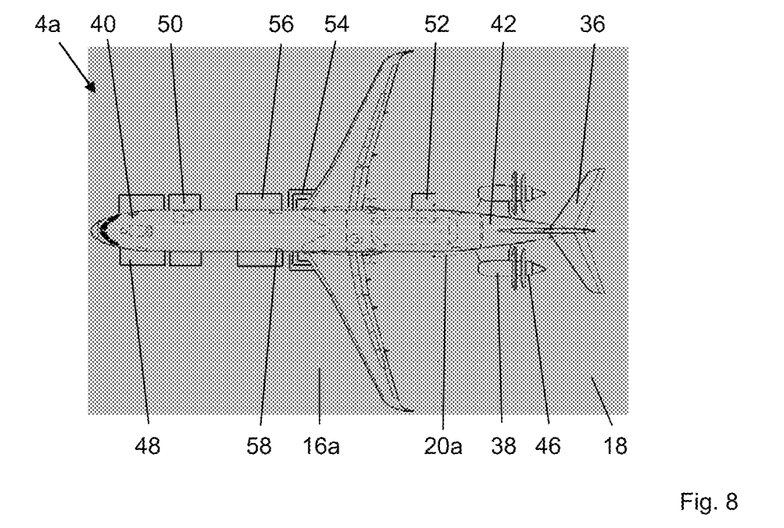

FIG. 8 shows a detailed view of a construction site 16a according to the second exemplary embodiment according to FIG. 7. The aircraft 4a has entered clocked production in the receiving device 20a of the work stage 18 by its aft section 42. By way of the work stage 18, cabin assembly, tail unit assembly and engine installation are carried out. The cockpit 40 is accommodated in a front work platform 48. The front work platform 48 and the carousel 6 each comprise an associated freight platform 50, 52 to ensure the supply of parts, production means and the like. For wing assembly a work platform 54 on the wing side is provided. For improved access to the fuselage 28 a work platform 56 on the door side is arranged in the middle fuselage region, by way of which work platform 56 both aircraft doors 58 in this fuselage region can be served.

Figure 9:
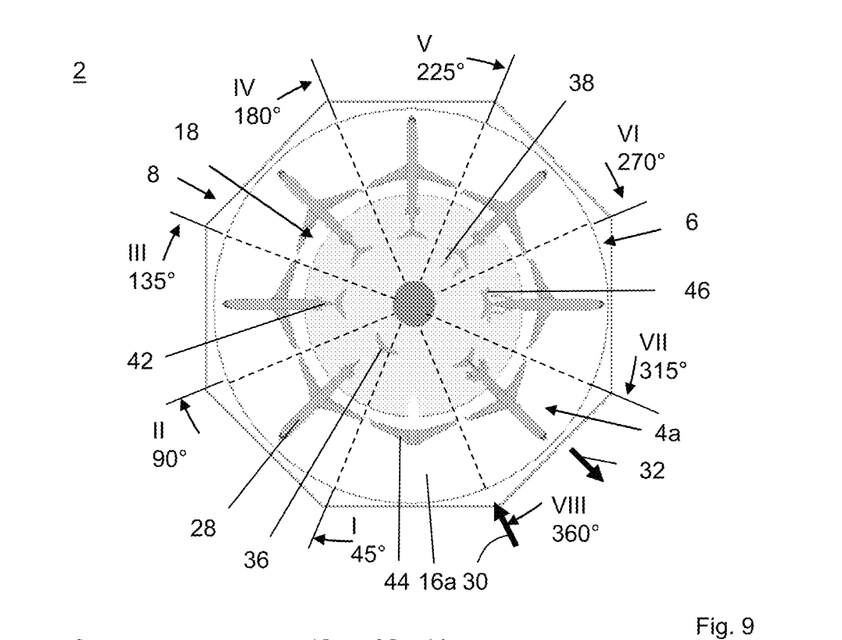

FIG. 9 shows a top view of a third exemplary embodiment of an apparatus 2 according to the invention with a carousel 6 arranged in a hall 8. The individual steps or phases of final assembly during rotation of the carousel 6 by 360° are shown in an exemplary manner on a construction site 16a. In contrast to the second exemplary embodiment according to FIG. 7, on this carousel 6 eight aircraft 4a, 4b, . . . can be assembled simultaneously, so that this carousel 6 features a higher rate of final assembly than do the carousels 6 according to the first and second exemplary embodiments. The aircraft have entered clocked production in the respective construction site 16a, 16b, . . . on the carousel 6 by their aft sections. Each construction site 16a, 16b, . . . comprises a 45°-segment. In this exemplary embodiment final assembly is correspondingly divided into eight phases I to VIII. Below, the function of the carousel 6 has been explained with reference to construction site 16a.

In a first phase I two individual wings and individual fuselage sections (not shown) on the carousel 6 enter clocked production according to arrow 30 and are joined to form a wing module 44 and a fuselage 28.

In a second phase II, which commences following 45°-rotation of the carousel 6, wing assembly takes place, in which the wing module 44 is connected to the fuselage 28. Furthermore, a tail unit 36 for subsequent tail unit assembly is provided. Moreover, system installation commences.

In a third phase III, which commences following 90°-rotation of the carousel 6, assembly of the tail unit takes place during which the tail unit 36 is connected to the aircraft's aft section 42. Furthermore, cabin assembly commences.

In a fourth phase IV, which commences following 135°-rotation of the carousel 6, and in a fifth phase V, which commences following 180°-rotation of the carousel 6, system installation and cabin assembly are completed.

In a sixth phase VI, which commences following 225°-rotation of the carousel 6, the installation of engines 38, which have previously been deposited on the work stage 18 on the construction site 16a, takes place on the aircraft's aft section 42. The engines 38 are designed as open rotor engines.

In a seventh phase VII, which commences following 270°-rotation of the carousel 6, engine installation is completed with the installation of rotors 46 that have previously been deposited on the carousel 6.

In an eighth phase VIII, which commences following 315°-rotation of the carousel 6, the end phase with final ground tests is initiated. Following successful completion of these tests the aircraft 4a leaves clocked production according to arrow 32, and the construction site 16a is prepared for final assembly of a new aircraft 4a' so that following 360°-rotation the carousel 6 is prepared for commencement of the first phase I of final assembly of the aircraft 4a' about to be assembled. For the sake of completeness it should be mentioned that this new aircraft 4a' is already the ninth aircraft that is assembled on the carousel 8, because after termination of each phase I to VII on the construction site 16a a new aircraft enters clocked production on the construction sites 16b, 16c, . . . .

Figure 10:
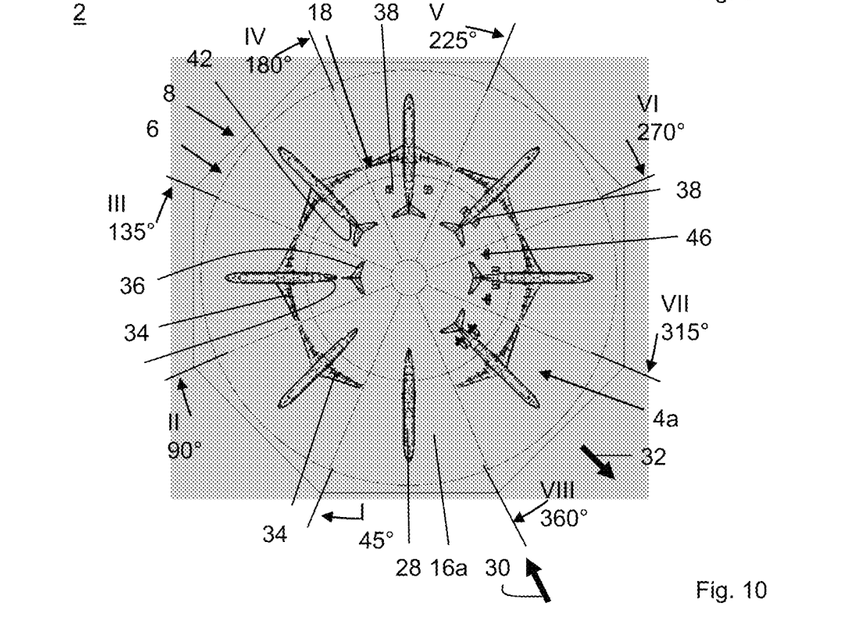

FIG. 10 shows a fourth exemplary embodiment of an apparatus 2 according to the invention with a carousel 6 arranged in a hall 8 for the simultaneous receiving of eight aircraft 4a, 4b, . . . . The individual steps or phases of final assembly during 360°-rotation of the carousel 6 are shown in an exemplary manner on a construction site 16a. Below, the function of the carousel 6 is explained with reference to this construction site 16a.

In a first phase I the fuselage is assembled on the construction site 16a. To this effect according to arrow 30 fuselage sections enter clocked production on the construction site 16a and are joined to form the fuselage 28.

In a second phase II, which commences following 45°-rotation of the carousel 6, wing assembly takes place to arrange wings 34, which have previously been deposited on the construction site 16a, on the fuselage 28.

In a third phase III, which commences following 90°-rotation of the carousel 6, wing assembly is completed, and a tail unit 36 is deposited on the construction site 16a for subsequent assembly of the tail unit.

In a fourth phase IV, which commences following 135°-rotation of the carousel 6, tail unit assembly is carried out on the aircraft's aft section 42, and system installation and cabin assembly commence.

In a fifth phase V, which commences following 180°-rotation of the carousel 6, engine installation commences with depositing engines 38 and engine nacelles (not shown) in the region of the work stage 18. The engines 38 are designed as open rotor engines. Cabin assembly is completed in this phase V.

In a sixth phase VI, which commences following 225°-rotation of the carousel 6, the engines 38 and the nacelles are attached to the aircraft's aft section 42.

In a seventh phase VII, which commences following 270°-rotation of the carousel 6, engine installation is completed with the installation of rotors 46 that have previously been deposited on the carousel 6.

In an eighth phase VIII, which commences following 315°-rotation of the carousel 6, the end phase with final ground tests is initiated. Following successful completion of these tests the aircraft 4a leaves clocked production according to arrow 32, and the construction site is prepared for final assembly of a new aircraft 4a', so that following 360°-rotation the carousel 6 is prepared for initiating the first phase I of final assembly of the aircraft 4a' about to be assembled. For the sake of completeness it should be mentioned that this new aircraft 4a' is already the ninth aircraft that is assembled on the carousel 8, because after termination of each phase I to VIII on the construction site 16a a new aircraft enters clocked production on the construction sites 16b, 16c, . . . .

Disclosed is a method for the final assembly of aircraft 4a, 4b, . . . that are arranged side by side on a carousel 6, as well as an apparatus 2 for carrying out this method.

LIST OF REFERENCE CHARACTERS

2 Apparatus
4a to 4f Aircraft
6 Carousel
8 Hall
10 External circumference
12 Rotation axis
14 Clockwise/direction of rotation
16a to 16f Segment
18 Work stage
20a to 20f Receiving device
22 Logistics area
24 Sidewall
26 Gate
28 Fuselage
30 Enter clocked production
32 Leave clocked production
34 Wing
36 Tail unit
38 Engine
40 Cockpit
42 Aircraft's aft section
44 Wing module
46 Rotor
48 Front work platform
50 Freight platform
52 Freight platform
54 Work platform on the wing side
56 Work platform on the door side
58 Aircraft door

What is claimed is:

1. A method for final assembly of at least two aircrafts comprising:
   assembling the at least two aircrafts in a transverse direction on a carousel, the at least two aircrafts being disposed side-by-side;
   accessing the at least two aircrafts by a work stage disposed at a center of the carousel, an entire circumference of the carousel being accessible from the work stage, the work stage including at least two receiving devices which have a U-shaped form open in a radial direction of the carousel into which the at least two aircrafts are partially inserted with their longitudinal axes extending in the radial direction; and
   rotating the carousel on a vertical rotation axis 360°.

2. The method as recited in claim 1, further comprising entering the at least two aircrafts in clocked production on the carousel on a respective construction site before the assembling, the at least two aircrafts remaining on the respective construction during the assembling.

3. The method as recited in claim 2, wherein the rotating includes continuously rotating the carousel.

4. The method as recited in claim 1, further comprising entering at least one new aircraft in clocked production following one 360° rotation of the carousel.

5. The method as recited in claim 1, further comprising removing one of the at least two aircrafts from clocked production at a uniform rotational position of the carousel.

6. The method as recited in claim 5, wherein the removing is performed after a 300° rotation of the carousel.

7. The method as recited in claim 2, wherein the entering includes disposing a cockpit of each of the at least two aircrafts so as to face the center of the carousel.

8. The method as recited in claim 2, wherein the entering includes disposing an aft section of each of the at least two aircrafts so as to face the center of the carousel.

9. The method as recited in claim 1, further comprising rotating the work stage together with the carousel.

10. The method as recited in claim 1, wherein the accessing includes accessing a door at a cockpit end of one of the at least two aircrafts by the work stage being disposed on scaffolding on the carousel such that the work stage is substantially level with the door.

11. A method for final assembly of at least two aircrafts comprising:

receiving the at least two aircrafts on a carousel such that a portion of each of the at least two aircrafts is received within an outer circumference of a work stage disposed at a center of the carousel, the work stage including at least two receiving devices which have a U-shaped form open in a radial direction of the carousel into which the at least two aircrafts are partially inserted with their longitudinal axes extending in the radial direction;

assembling the at least two aircrafts from the work stage; and rotating the carousel on a vertical rotation axis 360°.

12. A method for final assembly of at least two aircrafts comprising:

receiving the at least two aircrafts on a carousel side-by-side such that a portion of each of the at least two aircrafts is received within an outer circumference of a work stage disposed at a center of the carousel and elevated above the carousel, the work stage being configured such that the at least two aircrafts are able to freely enter and exit the carousel;

assembling the at least two aircrafts from the work stage; and rotating the carousel on a vertical rotation axis 360°.

* * * * *